(12) United States Patent
Jorgensson

(10) Patent No.: US 10,391,852 B2
(45) Date of Patent: Aug. 27, 2019

(54) AXLE PROVIDED WITH A HYBRID DRIVE MODULE

(71) Applicant: Volvo Car Corporation, Gothenburg (SE)

(72) Inventor: Mathias Jorgensson, Stenungsund (SE)

(73) Assignee: Volvo Car Corporation, Gothenburg (SE)

( * ) Notice: Subject to any disclaimer, the term of this patent is extended or adjusted under 35 U.S.C. 154(b) by 154 days.

(21) Appl. No.: 15/370,556

(22) Filed: Dec. 6, 2016

(65) Prior Publication Data

US 2017/0182878 A1      Jun. 29, 2017

(30) Foreign Application Priority Data

Dec. 23, 2015  (EP) ..................................... 15202308

(51) Int. Cl.
*B60K 6/30*  (2007.10)
*B60K 6/52*  (2007.10)
(Continued)

(52) U.S. Cl.
CPC .................. *B60K 6/52* (2013.01); *B60K 6/30* (2013.01); *B60K 6/365* (2013.01); *B60K 6/387* (2013.01); *B60K 6/48* (2013.01); *B60K 17/34* (2013.01); *B60K 23/0808* (2013.01); *B60K 2006/4825* (2013.01); *B60Y 2200/92* (2013.01); *Y10S 903/911* (2013.01); *Y10S 903/916* (2013.01); *Y10S 903/96* (2013.01)

(58) Field of Classification Search
CPC . B60K 6/52; B60K 6/30; B60K 6/387; B60K 17/34; B60K 23/0808
See application file for complete search history.

(56) References Cited

U.S. PATENT DOCUMENTS 5,643,119 A * 7/1997 Yamaguchi .............. B60K 6/26
                                                     180/65.235
6,041,877 A * 3/2000 Yamada ................... B60K 6/40
                                                     180/242
(Continued)

FOREIGN PATENT DOCUMENTS

WO        2013077736 A1     5/2013

*Primary Examiner* — Joseph M Rocca
*Assistant Examiner* — Michael R Stabley
(74) *Attorney, Agent, or Firm* — Snyder, Clark, Lesch & Chung, LLP

(57) ABSTRACT

A powertrain is provided with a combustion engine, a front drive axle, a longitudinal drive shaft, and a rear drive axle, whereby the combustion engine is connected to a front drive axle, the longitudinal drive shaft, and the rear drive axle, such that the combustion engine can be in drive connection with the front drive axle, the longitudinal drive shaft, and the rear drive axle. The rear drive axle is provided with a hybrid drive module that comprises at least one drive unit and a transfer gear set. The transfer gear set comprises an input, an output, and a first connection clutch provided operatively in between the input and the output, whereby the output of the transfer gear set is adapted to be in drive connection with the rear drive axle. The longitudinal drive shaft is provided with a second connection clutch and, the first connection clutch and the second connection clutch are hydraulically controlled and are connected to a same hydraulic circuit.

9 Claims, 4 Drawing Sheets

(51) Int. Cl.
  *B60K 6/365* (2007.10)
  *B60K 6/387* (2007.10)
  *B60K 6/48* (2007.10)
  *B60K 17/34* (2006.01)
  *B60K 23/08* (2006.01)

(56) References Cited

U.S. PATENT DOCUMENTS

| | | | | |
|---|---|---|---|---|
| 6,549,840 | B1* | 4/2003 | Mikami | B60K 6/365 |
| | | | | 701/69 |
| 7,104,347 | B2* | 9/2006 | Severinsky | B60H 1/004 |
| | | | | 180/65.23 |
| 7,467,678 | B2* | 12/2008 | Tanaka | B60K 6/445 |
| | | | | 180/65.265 |
| 7,743,899 | B2* | 6/2010 | Capito | B60K 23/0808 |
| | | | | 192/54.3 |
| 7,770,678 | B2* | 8/2010 | Nozaki | B60K 6/48 |
| | | | | 180/65.6 |
| 8,083,016 | B2* | 12/2011 | Naik | B60K 6/365 |
| | | | | 180/242 |
| 8,668,621 | B2* | 3/2014 | Yoshida | B60K 6/48 |
| | | | | 477/5 |
| 9,061,681 | B2* | 6/2015 | Yoshida | B60K 6/48 |
| 2003/0085062 | A1 | 5/2003 | Bowen | |
| 2003/0234124 | A1* | 12/2003 | Pecnik | B60K 6/26 |
| | | | | 180/65.25 |
| 2005/0023102 | A1 | 2/2005 | Brissenden et al. | |
| 2006/0030450 | A1* | 2/2006 | Kyle | B60K 6/26 |
| | | | | 477/3 |
| 2010/0044129 | A1* | 2/2010 | Kyle | B60K 6/26 |
| | | | | 180/65.25 |
| 2015/0224867 | A1 | 8/2015 | Nett et al. | |
| 2015/0258886 | A1 | 9/2015 | Aimo et al. | |

\* cited by examiner

AXLE PROVIDED WITH A HYBRID DRIVE MODULE

TECHNICAL FIELD

The invention relates to the field of powertrains for vehicles, and especially a hybrid drive powertrain for a vehicle, such as a vehicle provided with both an electric motor and a combustion engine.

BACKGROUND ART

It is known, for example from PCT Publication No. WO 2013/077736 A1, to provide a front wheel drive vehicle with an electric driven rear-axle, to achieve a hybrid vehicle. This is a simple and easy way to create a hybrid vehicle, with only minor adjustments of the vehicle architecture. However, the driving behaviour of a vehicle provided with an electric driven rear-axle becomes unpredictable, because it is front wheel driven in some situations and rear wheel driven in others. Hence, there is a need for improvements.

SUMMARY OF THE INVENTION

An object of the present invention is to suggest a hybrid powertrain for a vehicle, which powertrain gives a better predictability of the vehicle behaviour and still is easy to implement. The object is achieved by the present invention according to claim 1. Further advantages are provided by the present invention as disclosed in the dependent claims and throughout the specification.

According to the present invention a powertrain with a combustion engine, a front drive axle, a longitudinal drive shaft and a rear drive axle, whereby the combustion engine is connected to the front drive axle, the longitudinal drive shaft and the rear drive axle such that the combustion engine can be in drive connection with the front drive axle, the longitudinal drive shaft and the rear drive axle.

The rear drive axle is provided with a hybrid drive module. The hybrid drive module comprises at least one drive unit and a transfer gear set, wherein the transfer gear set comprises an input and an output and a first connection clutch provided operatively in between the input and the output. The input and the output of the transfer gear set is connected with the first connection clutch such that the input and the output can be engaged and disengaged by setting the first connection clutch in an engaged or a disengaged position.

The longitudinal drive shaft is further provided with a second connection clutch and the first and the second connection clutch are hydraulically controlled and are connected to the same hydraulic circuit.

Due to that both the first and the second connection clutch are connected to the same hydraulic circuit is a less complex control structure is required, since the number of hydraulic circuits can be reduced. Further, less components and circuits leads to less packing volume.

With a drive/operative connection is defined as two parts that are in connection with each other, such that a drive force/torque can be transferred between the two parts, either directly or indirectly over one or several intermediate parts. A drive/operative connection does not have to be permanent, but can be achieved through engagement of one or several couplings or clutches between the two parts.

In exemplary embodiment of the powertrain the hybrid drive module comprises an electric motor and/or a flywheel. The hybrid drive module can be configured to only comprise one drive source or a plurality of drive source. By providing the hybrid drive module with a plurality of drive sources, the advantages of the respective drive source can be combined.

In exemplary embodiment of the powertrain the hybrid drive module comprises an electric motor, a flywheel and a planetary gear set, wherein the electric motor, the flywheel and the transfer gear set is connected over a planetary gear set and the output of the transfer gear set is adapted to drive upon a first input gear of the drive axle.

In an exemplary embodiment of the powertrain the planetary gear set comprises a ring gear, a planet carrier with planet gears and a sun gear. A drive shaft of the electric motor is connected to the ring gear, a drive shaft of the flywheel is connected to the sun gear and the input of the transfer gear set is connected to the planet carrier of the planetary gear set.

In another exemplary embodiment of the powertrain the sun gear is directly connected to a brake and connected to the flywheel over a release clutch. The release clutch is preferably of friction clutch type. By connecting the flywheel to the sun gear over a release clutch it is possible to control the amount of torque transferred to and from the flywheel from and to the sun gear, thus to control the amount of energy regenerated by braking, deceleration or like by the flywheel and the amount of energy provided from the flywheel.

It is understood that the disclosed exemplary embodiments of the powertrain is adapted to be provided in a vehicle, such as car or a truck.

A method for controlling a vehicle provided with a powertrain comprises a method step of; controlling the first and the second connection clutch, such that a desired torque distribution is achieved between the front axle and the rear axle, i.e. wheels of the vehicle. By a common control of the first and the second connection clutch, the energy provided from the hybrid drive module can be optimised and a smooth power split between the front wheels and the rear wheels can be achieved even when the amount of power delivered from the combustion engine and the hybrid drive module is changing.

The powertrain and its implementation in a vehicle provides mechanical all-wheel drive with assistance by the hybrid drive module. Since the hybrid drive module is connected to all wheels of the mechanical all-wheel drive via the axle, and not just the rear or front wheel pair, when additional power is added for improved performance, when only the hybrid drive module is used for propulsion of the vehicle or when energy is regenerated during e.g. braking all wheels of the vehicle is affected. This can be compared to that only one the rear wheel pair would be affected if a conventional electrified rear drive unit was used in order convert a front wheel drive vehicle into a hybrid vehicle. The present invention makes the driving behaviour of the vehicle more predictable than if just either the front or rear wheel pair would be affected.

In embodiments of the powertrain comprising a hybrid drive module provided with an electrical motor, the hybrid module is preferably connected to an electrical battery configured to store electrical energy generated by the electrical motor and provide stored electrical energy to the electrical motor when additional propulsion power is desired. The electric motor may be used for propulsion of the vehicle, for improving the performance of the vehicle or for regenerating energy during braking or deceleration of the vehicle. Stored electrical energy can also be used for providing other electrical components of the vehicle with electrical power.

By also adding a flywheel the energy regeneration in the hybrid module may be performed even more efficiently. Use of an electric motor involves that kinetic energy is transformed into electrical energy and then transformed back to kinetic energy when used for propulsion. Such energy transformations are associated with numerous energy losses, e.g. due to that when an electrical current flows through an electrical wire some energy is lost as heat. The higher the amount of regenerated energy is the higher will the energy losses be. The energy losses associated with regenerating energy by use of a flywheel, by which the kinetic energy is stored as kinetic energy and no energy transformation is necessary, are less. Thus, by using a flywheel for energy regeneration the energy losses can be lowered.

This present invention is particularly advantageous for high performance vehicles since the amounts of power used for improving the performance or during hybrid propulsion of the vehicle are larger, thus the energy losses are larger.

Except for providing better vehicle behaviour predictability and improved vehicle performance, the exemplary powertrains presented lowers the $CO_2$ footprint since the energy of the vehicle can be utilized more efficiently e.g. by using regeneration.

Packaging is generally a problem for vehicles of today. For hybrid vehicles, where additional components such as e.g. electric motors are needed, packaging is an even bigger issue. According to aspects of the present invention the hybrid drive module and the axle are arranged in a common housing. By arranging the hybrid drive module and the axle accordingly the packaging can be further optimized.

By controlling the second connection clutch it is possible to control the torque transferred from the combustion engine and the front drive axle via the longitudinal drive shaft to the axle comprising the rear drive axle.

An exemplary desired torque distribution between the front axle and the rear axle is 70% front wheel drive (i.e. front axle) and 30% rear wheel drive (rear axle) or 50% front wheel drive and 50% rear wheel drive. It is understood that the two mentioned distribution ratios are purely exemplary. However, the exemplary torque distribution of 70/30 is a preferred when it is desired that the front wheels accounts for the largest portion of the propulsion, which e.g. may be the case at slippery road conditions. An evenly distributed torque, thus a torque distribution of 50/50, may e.g. be preferred if higher vehicle performance is desired. Normally the torque distribution between the front and rear axle is continuously adjusted to be adapted to the momentary prevailing road and driving conditions.

In one exemplary embodiment of the powertrain and its control method the desired torque distribution is dependent on exemplary ambient conditions. Such exemplary ambient conditions may be any of, but not limited to; rain, snow, road surface condition and road surface inclination. By adjusting the torque distribution according to prevailing ambient conditions the driveability of the vehicle may be improved. E.g. at slippery road conditions, such as during heavy raining or humid conditions in combination with ambient temperature below the freezing point, it may be desirable that the driving of the vehicle is evenly distributed over all four wheels whereas at dry weather conditions and temperatures above the freezing point it may be desirable that the rear wheels are driving more than the front wheels for improved performance. The adaption of the torque distribution further be dependent on exemplary vehicle and driver parameters such as driving mode, tire pressure and acceleration demand.

The present invention also comprises a method for controlling the torque contribution to the rear drive axle from the combustion engine over the second connection clutch dependently on the torque contribution to the rear drive axle from the hybrid module by controlling the second connection clutch.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

DETAILED DESCRIPTION

Figure 1:
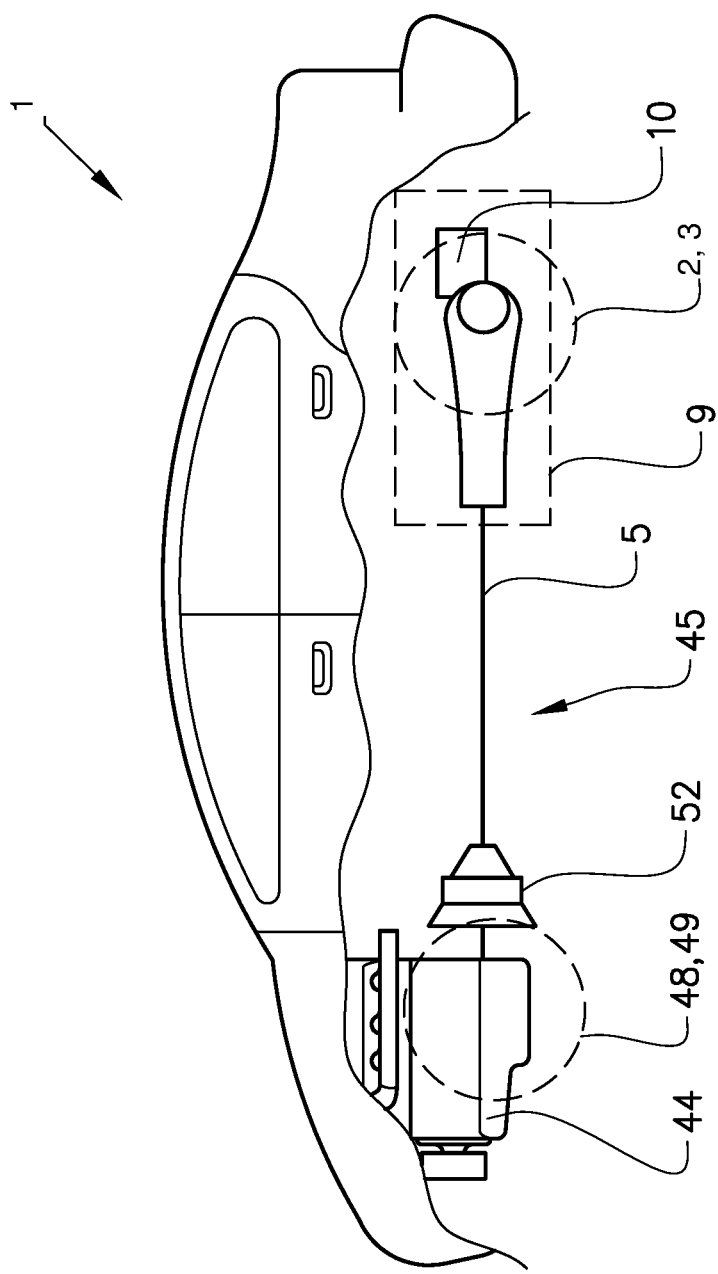
FIG. 1 discloses a schematic view of a vehicle.

FIG. 1 discloses a schematic view of a vehicle 1 comprising a hybrid powertrain 45. The hybrid powertrain 45 is provided with an axle 9, comprising a hybrid drive module 10, of the present invention. The axle 9 comprising the hybrid drive module 10 is provided at a rear end of the vehicle 1 and are coupled to a pair of rear wheels 2, 3 such that the hybrid drive module 10 may drive the rear wheels 2, 3. The hybrid powertrain 45 further comprises a combustion engine 44 and a transmission 52 provided in a front end of the vehicle 1. The combustion engine 44 is coupled, via the transmission 52, to a pair of front wheels 48, 49 such that the combustion engine may drive said front wheels 48, 49.

The driving behaviour of a hybrid vehicle provided with a combustion engine driving the front wheels and a hybrid drive module driving just the rear wheels is often unpredictable. Continuous, perfect synchronization between the front and rear wheels during e.g., hard acceleration, where additional propulsion power may be provided by the hybrid drive module, or braking, where the hybrid drive module may be used for brake regeneration, is hard to maintain. Depending on if such vehicle is driven by the combustion engine or the hybrid drive module the vehicle will either be front or rear wheel driven. Also regeneration, a functionality that for such a vehicle is applied to the rear wheel independently of if the vehicle currently is front or rear wheel driven, may affect the driving behaviour predictability and the overall driveability.

The hybrid powertrain 45 of the vehicle 1 disclosed in FIG. 1 additionally comprises a longitudinal drive shaft 5 connecting the combustion engine 44, via the transmission 52, to the axle 9. The longitudinal drive shaft 5 enables that torque can be transferred from the combustion engine 44 provided in the front end of the vehicle to the axle 9 provided in the rear end of the vehicle and vice versa wherein the front and rear wheels 48, 49; 2, 3 can be driven by the combustion engine 44 and/or the hybrid drive module 10 of the axle 9. This enables that the front and rear wheels 48, 49; 2, 3 can be driven synchronous independently of if the vehicle currently mainly is driven by the combustion engine 44 or the hybrid drive module 10, which will improve the predictability of the driving behaviour of the vehicle 1. This will also improve the driveability of the vehicle 1.

Figure 2:
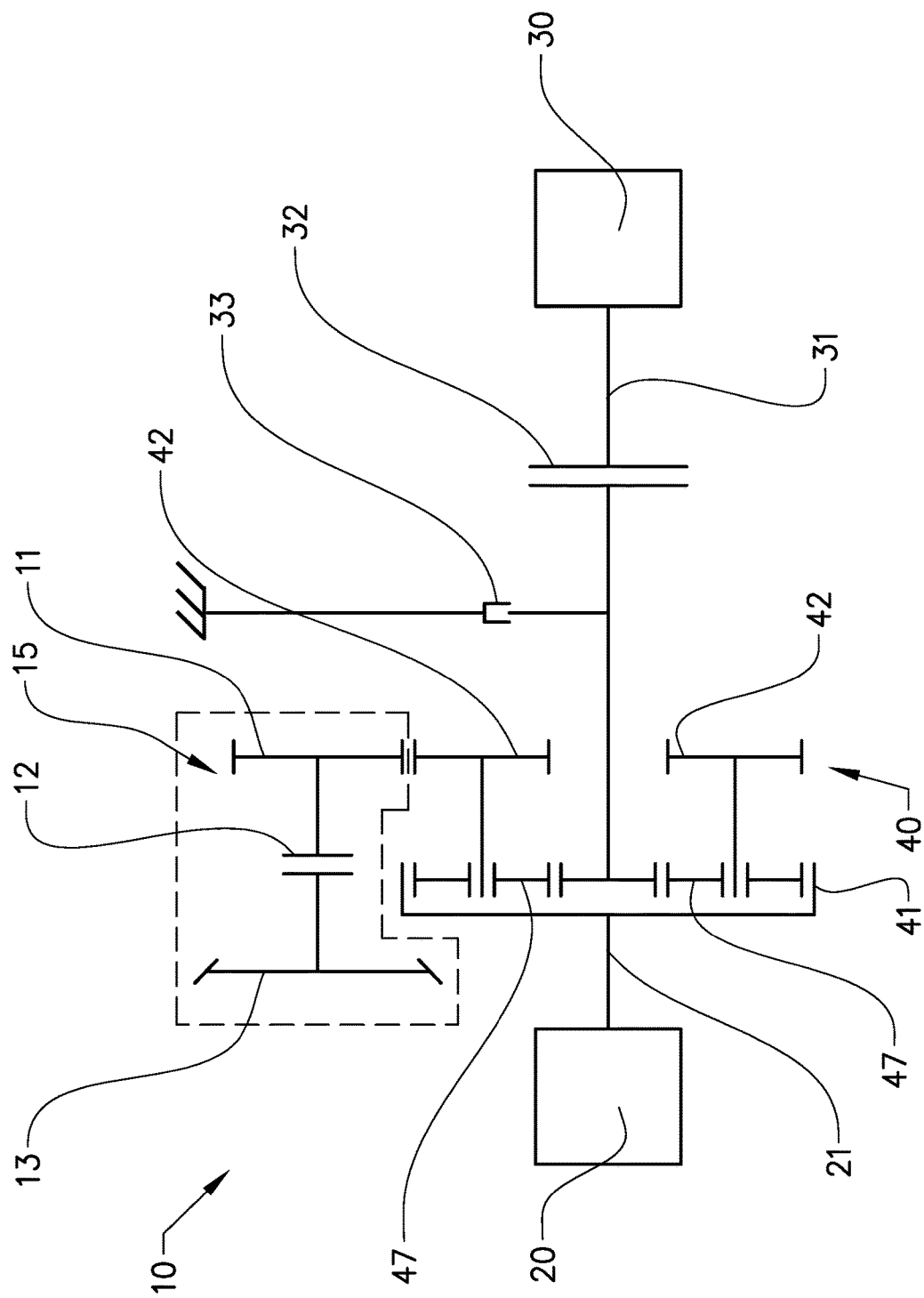
FIG. 2 discloses a schematic view of a hybrid drive module.

FIG. 2 discloses a schematic view of a hybrid drive module 10. The hybrid drive module 10 comprises an electric motor 20, a planetary gear set 40 and a flywheel 30.

The planetary gear set comprises a sun gear 43, a ring gear 41, planet gears 47 and planet carriers 42. How the components 41, 42, 43, 47 of a planetary gear set 40 meshes with each other is not part of the invention per se and is considered to be part of common general knowledge. In the embodiment shown in FIG. 2 the electric motor 20 is coupled to the ring gear 41 by a drive shaft 21 of the electric motor 20. The flywheel 30 is coupled to the sun gear 43 by a drive shaft 31 of the flywheel 30. Further, the drive shaft 31 of the flywheel 30 is provided with a release clutch 32, wherein the flywheel 30 can be engaged and disengaged from the sun gear 43. By controlling the release clutch 32 the rotational power transferred from the flywheel 30 to the sun gear 43 can be controlled.

Additionally, the hybrid drive module 10 comprises a transfer gear set 15. The transfer gear set 15 comprises an input 11, an output 13 and a first connection clutch 12. The input 11 is coupled to the output 13, wherein the input 11 is provided to mesh with the planet carrier 42 such that rotational power provided to or from the electric motor 20 and/or the flywheel 30 can be transferred over the transfer gear set 15 to the output 13. The first connection clutch 12 of the transfer gear set 15 is provided to control the rotational power transferred from the input 11 to the output 13.

The hybrid drive module 10 also comprises a brake 33. The brake is provided in order to be able to improve the controllability the hybrid drive module 10.

Figure 3:
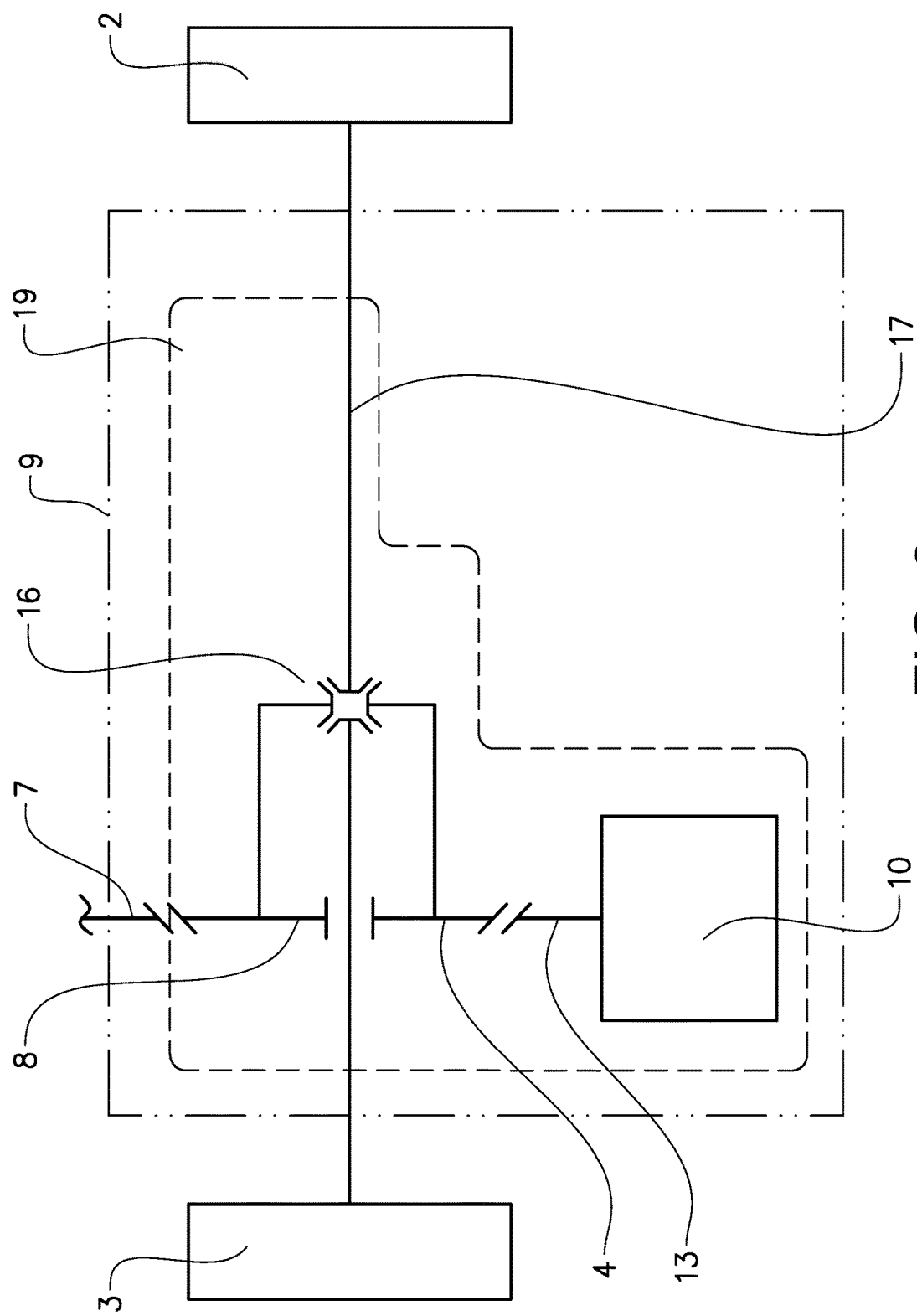
FIG. 3 discloses a schematic view of an axle of the present invention.

Referring now to FIG. 3, disclosing a schematic view of an embodiment of an axle 9 according to the present invention. The axle 9 comprises the hybrid drive module 10, as previously disclosed in relation to FIG. 2, a first input gear 4, a rear differential gear 16, an output gear 8 and a rear drive axle 17. The output 13 of the hybrid drive module 10 is provided to mesh with the first input gear 4. The first input gear 4 is rotationally coupled via at least a first pair of bevel gears or like to the rear differential gear 16. The rear differential gear 16 is rotationally coupled to the rear drive axle 17 via at least a second pair of bevel gears or like to the output gear 8. The output gear 8 is rotationally coupled to a second input gear 7. The rear drive axle 17 is provided with a pair of rear wheels 2, 3, wherein by rotating the rear drive axle 17 the rear wheels 2, 3 are driven.

Thus, by controlling the first connection clutch 12 the torque transferred from the electric motor 20 and the flywheel 30 to the rear drive axle 17 can be controlled.

In the embodiment of the present invention disclosed in FIG. 3 the hybrid drive module 10 and the axle 9 are arranged in a common housing 19. Arranging the hybrid drive module 10 and the axle 9 in a common housing is preferred from a packaging perspective.

Figure 4:
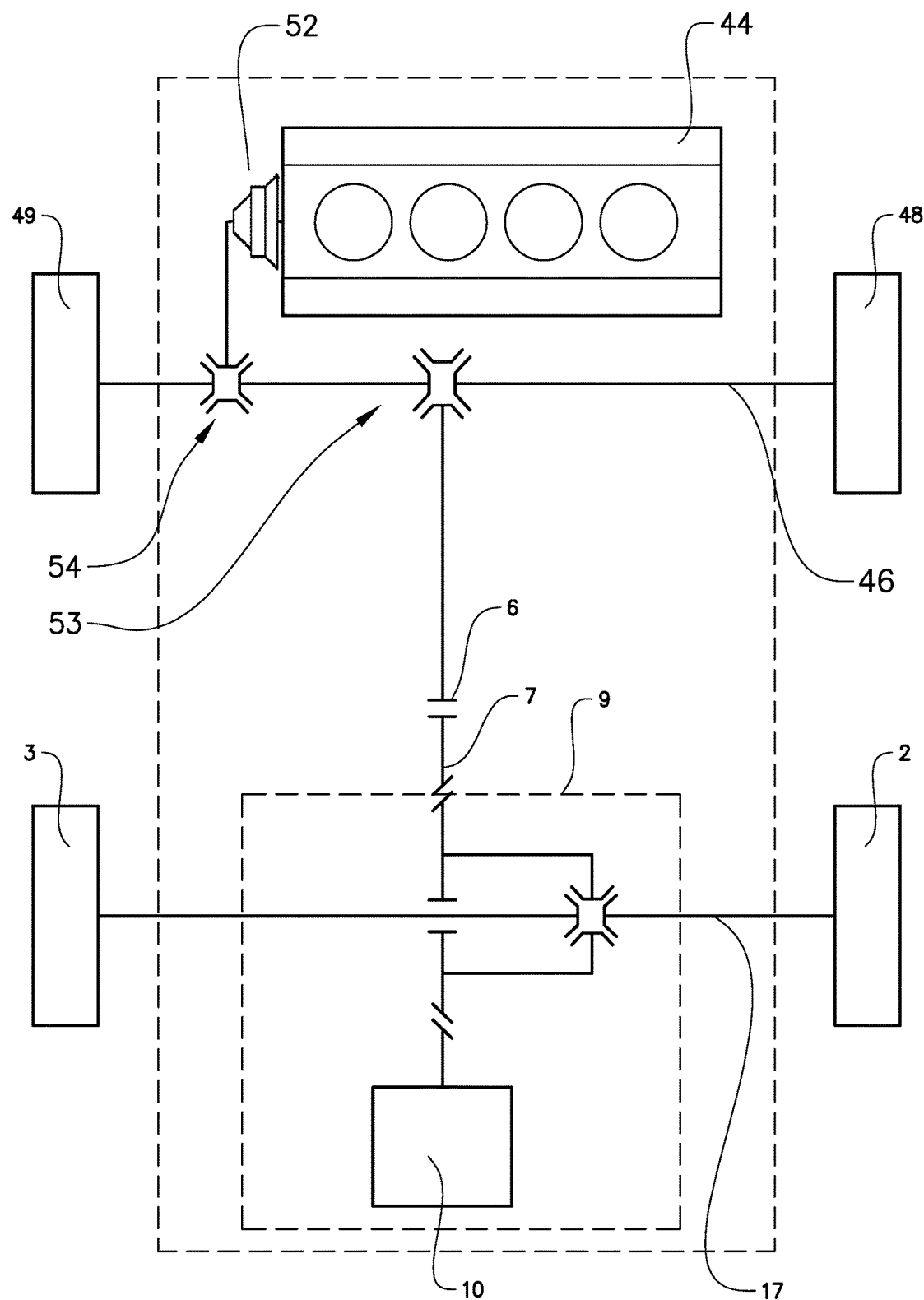
FIG. 4 discloses a schematic view of a hybrid powertrain.

FIG. 4 discloses a schematic view of a hybrid powertrain 45 as previously disclosed in relation to FIG. 1, comprising an axle 9, as previously disclosed in relation to FIG. 3, wherein the axle 9 in turn comprises a hybrid drive module 10, as previously disclosed in relation to FIG. 2. The powertrain 45 additionally comprises a second connection clutch 6, arranged between the second input gear 7 and the longitudinal drive shaft 5. As previously disclosed, the rear drive axle 17 is provided with rear wheels 2, 3 and the front drive axle 46 is provided with front wheels 48, 49.

In the opposite end of the longitudinal drive shaft 5, i.e., the end of the longitudinal drive shaft 5 not coupled to the second connection clutch 6, the longitudinal drive shaft 5 is rotationally coupled to a bevel gear 53. The powertrain 46 further comprises the combustion engine 44 which is connected to the transmission 52 transferring the torque generated by the combustion engine 44. The combustion engine 44 is via the transmission 52 rotationally coupled by at least a pair of bevel gears of the front differential 54 to the front drive axle 46 and the longitudinal drive shaft 5 is rotationally coupled by the bevel gears 53 to the front drive axle 46.

By controlling the second connection clutch 6, by disengaging and engaging the second connection clutch 6, the torque transferred between the axle 9, comprising the rear drive axle 17, and the front drive axle 46, coupled to the combustion engine 44, can be controlled. Thus, by controlling the second connection clutch 6 the torque transferred from the combustion engine 44 to the rear drive axle 17 for mechanical all-wheel drive can be controlled. When the flywheel 30 and/or the electric motor 20 of the axle 9 is used for propulsion of the vehicle 1, or is used to improve the performance of the vehicle 1, the second connection clutch 6 also controls the torque transferred from the axle 9 to the front drive axle 46. When the axle 9 is used for regeneration during braking or deceleration of the vehicle 1 the second connection clutch 9 also controls if and to what extent the front drive axle 46 is involved in the power regeneration. By engaging also the front drive axle 46 during braking or deceleration of the vehicle 1 more braking power can be regenerated than if only the rear drive axle 17 of the axle 9 is used.

How a differential comprising bevel gears is designed is not part of the invention per se and is considered to part of general knowledge. Herein, when referring to a differential comprising at least a pair of bevel gears also other designs of differentials, necessarily not comprising a pair of bevel gears, are considered.

It is to be understood that the present invention is not limited to the embodiments described above and illustrated in the drawings; rather, the skilled person will recognize that many changes and modifications may be made within the scope of the appended claims.

What is clamed is:

1. A powertrain provided with a combustion engine, a front drive axle, a longitudinal drive shaft, and a rear drive axle, whereby the combustion engine is connected to the front drive axle, the longitudinal drive shaft, and the rear drive axle, such that the combustion engine can be in drive connection with the front drive axle, the longitudinal drive shaft, and the rear drive axle, wherein the rear drive axle is provided with a hybrid drive module, comprising:
   at least one drive source; and
   a transfer gear set,
   wherein the transfer gear set comprises:
      an input;
      an output; and
      a first connection clutch provided operatively in between the input and the output,
   whereby the output of the transfer gear set is adapted to be in drive connection with the rear drive axle,
   wherein the longitudinal drive shaft is provided with a second connection clutch,
   wherein the first connection clutch and the second connection clutch are hydraulically controlled and are connected to a same hydraulic circuit, and
   wherein said hybrid drive module further comprises an electric motor and a flywheel operable as independent drive sources, each being independent from the combustion engine.

2. The powertrain according to claim 1, wherein the hybrid drive module further comprises:
   a planetary gear set,
   wherein the electric motor, the flywheel, and the transfer gear set are connected over the planetary gear set and the output of the transfer gear set is adapted to drive upon a first input gear of the rear drive axle.

3. The powertrain according to claim 2, wherein the planetary gear set comprises:
- a ring gear,
- a planet carrier; and
- a sun gear,
- wherein a drive shaft of the electric motor is connected to the ring gear, a drive shaft of the flywheel is connected to the sun gear, and the transfer gear set is connected to the planet carrier of the planetary gear set.

4. The powertrain according to claim 3, wherein the sun gear is directly connected to a brake and connected to the flywheel over a release clutch.

5. A vehicle provided with the powertrain according to claim 1.

6. A method for controlling the vehicle according to claim 5, comprising:
controlling the first and the second input connection clutch, such that a desired torque distribution is achieved between the front drive axle and the rear drive axle.

7. The method according to claim 6, wherein the desired torque distribution is one of:
- 70% front wheel drive and 30% rear wheel drive, or
- 50% front wheel drive and 50% rear wheel drive, as starting distribution for an all-wheel drive.

8. The method according to claim 6, wherein the desired torque distribution is dependent on ambient conditions.

9. The method according to claim 6, wherein a torque contribution to the rear drive axle from the combustion engine controlled over the second connection clutch is dependent on the torque contribution to the rear drive axle from the hybrid drive module.

\* \* \* \* \*